3,089,811
ARYL MERCURIC FUNGICIDAL COMPOSITIONS
Harry H. Pugh, Chicago, Ill., assignor to Gillette Inhibitor Co., Chicago, Ill., a corporation of Illinois
No Drawing. Filed Feb. 24, 1959, Ser. No. 794,797
6 Claims. (Cl. 167—42)

My invention relates to new and useful aryl mercuric salt compositions which possess germicidal, bactericidal, disinfectant and fungicidal properties and which are especially efficacious for the prevention and control of soil-borne and other fungus diseases on lawns and various flowering plants.

Aryl mercuric salts, for instance, phenyl mercuric acetate, phenyl mercuric borate, phenyl mercuric gluconate, benzyl mercuric acetate, pyridyl mercuric acetate, chlorphenyl mercuric acetate, and the like, have long been known for use as germicidal, bactericidal, disinfectant and fungicidal agents for the treatment of seed and plant diseases. Typical of disclosures of such aryl mercuric salts and the aforesaid uses thereof are those of U.S. Patents Nos. 1,770,886; 1,770,887; 1,787,581; 2,044,959; 2,070,080; 2,423,121; 2,423,262; 2,538,595; 2,619,446 and 2,824,825; and The Yearbook of Agriculture, United States Department of Agriculture (1953).

Despite such uses and disclosures, various of the compositions in which the aryl mercuric salts are incorporated have a number of objections. Thus, for instance, when used for the treatment of plants, the compositions frequently exhibit phytotoxicity. Again, certain of the compositions are difficult to handle, being particularly irritating in contact with the human skin. Other objections also obtain with which those versed in the art are familiar.

I have evolved new and useful aryl mercuric acid salt compositions which have especial utility in the field of treatment of fungus diseases on lawns and various flowering plants and other forms of ornamental vegetation, including deciduous and evergreen plants, but which also have utility for other purposes where bactericidal, germicidal and disinfectant action is a desideratum.

In accordance with my present invention, an acrylic polymer emulsion is admixed with ammonia in an amount sufficient to convert the emulsion into a solution, the term "solution," as used herein, including not only true solutions but also colloidal solutions, and is then admixed with an appropriate amount of a solubilized aryl mercuric salt. If desired, prior or subsequent to the admixture of the acrylic polymer emulsion with the ammonia, water may be added to produce a more dilute and less viscous product. The addition of the ammonia to the acrylic polymer emulsion causes an exothermic action and it may be of advantage, therefore, to carry out said step under conditions wherein the mixture is cooled. A preferred procedure is to add the acrylic emulsion to a desired quantity of water, then add concentrated aqueous ammonia until a clear or substantially clear solution is obtained and a pH of about 9.9 or slightly higher, for example, 10.5 is reached, and then add a solution of the solubilized phenyl mercuric acetate or other solubilized aryl mercuric salt. The latter, for instance, may be in the form of a 20% to 35% solution of the aryl mercuric salt. In the preparation of the compositions of the present invention, it is advantageous to admix such solubilized aryl mercuric acid salts, notably the phenyl mercuric acetate solutions, with aqueous ammonia and then add the same to the previously prepared solutions comprising ammoniated acrylic polymer emulsions. The final compositions, which are in the form of concentrates, can be diluted down with water to produce a concentration of 1 part of phenyl mercuric acetate, or other aryl mercuric acid salts, in, say, 200,000 parts of composition and, when used in this form, the said compositions have excellent fungicidal effect against the many types of fungi which are susceptible to treatment with organic mercurials such as phenyl mercuric acetate.

The ammonia content serves a number of purposes in the composition of the present invention. Apart from its conversion of the acrylic polymer emulsion to a solution, a step which, per se, is known, the ammonia also serves as a disinfestant and as a source of food for plants treated with the compositions of the present invention. My compositions permit the utilization of appreciable concentrations of ammonia without causing burning of the plants, and it appears that the ammonia, in combination with the other ingredients of the compositions of my invention, brings about anti-shock or protective action on plants which is not characteristic of various plant disinfestants, disinfectants and protectants heretofore known and used in the art.

The acrylic polymer emulsions, which constitute one of the starting materials used in the preparation of the compositions of this invention, are commercial articles of commerce. They may be purchased in the form of dry compositions which, when admixed with water, produce the emulsions or they may be purchased as liquid emulsions containing, for instance, of the order of 35% to 50%, by weight, of the acrylic polymer solids. It will be understood, in this connection, that the term "polymer" is used generically to include copolymers so that the present invention contemplates the utilization of acrylic polymers and acrylic copolymers, in emulsion form, for admixture with ammonia and the aryl mercuric acid salts as described above. In general, while the present invention contemplates the utilization of any of the acrylic polymer emulsions, it is particularly desirable to utilize those acrylic polymer emulsions in which the acrylic polymer is a polymethylmethacrylate or a polyethylmethacrylate. Polybutylmethacrylate, methacrylamide polymers, methacrylic acid polymers, and mixtures of various acrylic polymers which may be made, for example, by admixing acrylic monomers of various types and polymerizing or copolymerizing them and preparing the final acrylic polymer compositions in emulsion form, can be utilized. My invention may be practiced with particularly good results utilizing such commercial acrylic polymer emulsions as those which are sold under the trade names Rhoplex ASE Base 75, Rhoplex AC-33, Acrysol ASE-60, and Acrysol ASE-75, said products being sold by the Resinous Products Division of Rohm & Haas Company. Rhoplex ASE Base 75, for example, contains approximately 46% of the acrylic polymer, by weight, and the same is true with respect to Rhoplex AC-33; and Acrysol ASE-75 contains approximately 40% of acrylic polymer solids.

The solubilized aryl mercuric salts which are utilized in the production of the compositions of my invention are, per se, known in the art and are shown, for instance, in U.S. Patents Re. No. 23,863 and Nos. 2,754,241 and 2,824,825. Especially preferred are the solubilized phenyl mercuric acetate products made in accordance with said reissue patent, typical of which are approximately 25 to 35% active solutions in which the mercury content as metal is about 15 to 20%.

The amount of ammonia used in the compositions of the invention may vary somewhat but is, in general, the amount of ammonia which is sufficient at least to convert the acrylic emulsion to a solution. Generally speaking, the pH of the resulting solution should be in the range of about 10 to about 11.5. Ordinarily, the pH, after the addition of the ammonia to convert the acrylic polymer emulsion to a solution, will be of the order of 9 or somewhat over 9 and the pH can then be adjusted to maintain the solution form and at the same time to maintain added aryl mercuric acid salt in solution. The ammonia can be added in any desired form but it is advantageous to employ it in the form of concentrated solutions containing of the order of 26 to 28% ammonia.

The proportions of the ingredients of the compositions of my invention are variable within relatively wide limits. Thus, for example, excellent results are obtained, depending upon the particular use involved, through the utilization of from 1 to 32, preferably 4 to 16, parts of an arylic polymer emulsion containing from 35% to 50% by weight of solids, from 0.5 to 50 parts by weight of concentrated aqueous ammonia or 28% aqeous ammonia to convert said emulsion to a solution, and sufficient of the solubilized aryl mercuric acid salt (containing, for instance, from about 25 to 35% activity) so as to produce final concentrates containing from about 0.5% to 5%, preferably about 2% to 3%, by weight of mercury as mercury. The water content is variable, depending upon whether the composition is in the form of a concentrate or whether it is diluted for end use and, of course, the extent of dilution can be varied depending upon the end use.

The following examples are illustrative of compositions made in accordance with my present invention. It will be understood, as previously indicated, that the proportions may be varied without in any manner departing from the principles of the invention and it will also be understood that said examples are in no way intended to be limitative of the full scope of the invention. All parts given are by weight.

*Example 1*

Acrylic emulsion (Rhoplex ASE Base 75, 40% solids) _____ 40
Solubilized phenyl mercuric acetate (25% solution) 40
Ammonia (28% $NH_3$) _____ 12.5
Water _____ 93.5

In use, 1 part of the composition of Example 1 is conveniently admixed with 800 to 1000 parts of water to produce a composition which is highly effective as a spray for plant life for fungicidal, bactericidal or protectant effects.

*Example 2*

Acrylic emulsion (Rhoplex ASE Base 75, 46% solids) _____ 6
Solubilized phenyl mercuric acid (30% solution)___ 30
Amonia (28% $NH_3$) _____ 25.5
Water _____ 62

*Example 3*

Acrylic emulsion Rhoplex ASE Base 75, 46% solids) _____ 8
Solubilized phenyl mercuric acetate (30% solution) _____ 30
Ammonia (28) $NH_3$) _____ 51
Water _____ 60

The compositions of the present invention, in use in agriculture, have the advantage, in the form of their particularly preferred embodiments, of being completely or substantially completely transparent, they produce film thicknesses of a low order thus bringing about substantial savings in cost, they have an emollient action, they do not prevent the growth nor the breathing of the foliage and they do not hinder photosynthesis. For the mechanical standpoint, they do not clog up the orifices of spray equipment, if such equipment is used in distributing compositions over the plants or like surfaces, and, because there is relatively little or no settling out even on standing over periods of several hours, litle or no agitation is required in the spray tank or like equipment.

To the base compositions of my invention consisting of the ammoniated acrylic emulsion and the aryl mercuric salts, which compositions, as stated above, are in the form of solutions, generally of viscous character in the form of their concentrates, various additional ingredients can be added to produce special effects. These additions, depending on their nature, may bring about either a reduction or an increase in the pH of the base composition and, in general, such reduction may suitably go to about pH 7.2, and such increase may go to about 11 or 11.5 assuming, for instance, that the pH of the base composition may be of the order of 9 to 10. Such additions may, by way of illustration, comprise water-soluble plant foods which may be absorbed systemically by the plants or through their roots in the vascular tissues of the plants whereby to promote rapid growth as well as protection against fungi.

Furthermore, the compositions of my invention may be admixed with various known toxicant materials. Thus, for instance, Malathion, in the form of the 95% technical grade, can be admixed with the compositions of my invention, together with a suitable emulsifier, for instance, sorbitol mono-oleate, to produce compositions in which recommended concentrations of Malathion are present so that the compositions are effective in the treatment of plant diseases for which Malathion is indicated and without harmful effects so far as phytotoxicity is concerned. Again, in another illustrative case, dieldrin can be dissolved in xylene and added to compositions made in accordance with my invention, in conjunction with known suitable emulsifying agents, to produce final products, after dilution with water, which are highly effective for the treatment of insects which are susceptible to destruction by dieldrin. Other typical toxicants with which the compositions of the present invention can be utilized comprise aldrin, toxaphene, heptachlor and methoxychlor, it being understood, of course, that said toxicants are selected to be compatible with the particular aryl mercuric salt involved. The phytotoxicity characteristic of various aromatic hydrocarbon solvents, utilized with toxicants such as dieldrin, for example, appears to be appreciably reduced when embodied into or admixed with the compositions of my invention as described herein.

The compositions of my invention, as stated above, have particular utility for the treatment or control of fungus diseases which attack lawns or turfs and various plants. Thus, by way of example, good control is had of such fungus diseases as cause brown patch, copper spot, dollar spot, snow mold, pink spot and fading out, as well as blue grass leaf spot and zonate eyespot. Taking as illustrative, a concentrate composition made in accordance with my invention and containing 1% phenyl mercuric acetate, one satisfactory mode of treatment is to dilute 2 to 3 ounces of said concentrate with 3 gallons of water, and then to saturate the soil to at least 1 inch below root level very early in spring. This treatment may be repeated every 3 to 4 weeks or oftener if necessary. This treatment is advisably repeated just prior to the first snowfall, in northern areas, to assist in the prevention of snow mold. On newly sown lawns, it is preferred to saturate the soil immediately after the lawn seed is planted. In general, after the initial treatment, as specified above, the concentrate may be used in proportions of about 1 ounce per 3 gallons of water for a regular spray program.

The compositions of my invention have also been found to be effective in the prevention or control of such fungi as *Pythium debaryanum, Pythium graminicola, Botrytis cinerea, Fusarium nivale, Rhizoctonia solani, Corticium fuciforme,* Curvularia and *Helminthosporium vagans* and *Phialophora cinerescens.* In greenhouse operations, good results have been obtained in relation to control of fungi infections of such plants as calceolaria, cineraria, primroses, stocks, snapdragon, O. poppies, pansies, clarkia, calendulas, hydrangeas, carnations and chrysanthemums. The concentrate compositions, properly diluted with water, should, for best results, be applied on a regular schedule of approximately 10-day intervals. They may be applied at any time of the day without causing apparent shock, stunting or burning. Both in the greenhouse and outdoors, they have been successfully used to prevent such diseases as damping off, root rot, rust and stem rot.

In the treatment of tobacco plants, good results have been obtained, utilizing the compositions of my invention in proper dilutions as indicated above, say 1 ounce of the concentrate to 3 gallons of water, as a protectant against blue mold and damping off, by drenching the soil either before or after planting, then wetting the seedlings and soil on a regular program of one week to 10 day intervals. The compositions of the invention can also be used in the transplant water.

Excellent results have also been obtained, using the concentrates of the present invention in a dosage of 1 ounce to 3 gallons of water or 1 gallon to 400 gallons of water, as a protectant against damping off in tomato seed beds and without any apparent phytotoxicity. Good, healthy stands were obtained with no apparent effect on germination. The compositions of the present invention can also be used in the transplant watering to reduce the possibility of infection by other soil-borne diseases.

Other uses are for controlling damping off of Japanese yew cuttings and varieties of pine trees or, in brief, ornamental foliage plants of the evergreen group; on tropical and subtropical types of foliage plants both with respect to foliage protection as well as protection against soil-borne infections when the compositions are used as a soil drench in setting out cuttings or transplanting; for the control of black spot on roses; for protecting seed beds for transplants in connection with cuttings of flowering plants and foliage vegetation.

As a soil drench, the compositions can be used either before or immediately after planting seeds, bulbs or roots. In this use, the concentrate compositions of this invention are advantageously mixed in the proportion of 2 ounces to 3 gallons of water. The ground should be soaked to at least 2 inches below seed, bulbs or roots. The treatment may be repeated in about a week to 10 days by wetting of foliage and soil, using 1 ounce of the concentrate composition to 3 gallons of water.

While the invention has been described in detail, it will be understood that no unnecessary limitations should be imported thereinto.

What I claim as new and desire to protect by Letters Patent of the United States is:

1. Compositions, effective as fungicides, comprising an aryl mercuric salt, ammonia, acrylic polymer emulsion solids, and water.

2. Compositions, effective as fungicides, comprising a solubilized phenyl mercuric salt, ammonia, acrylic polymer emulsion solids, and water.

3. Compositions, effective as fungicides, comprising the following ingredients in substantially the following parts by weight to each other:

| | |
|---|---|
| Acrylic polymer emulsion (containing from 35 to 50% by weight of solids) | 1 to 32 |
| Concentrated aqueous ammonia | 0.5 to 50 |
| Phenyl mercuric salt in solubilized form containing 25% to 35% of said salt (sufficient to produce a content of 0.5% to 5% of mercury as based on the weight of the compositions). | |

4. Compositions, effective as fungicides, comprising the following ingredients in substantially the following parts by weight to each other:

| | |
|---|---|
| Acrylic polymer emulsion (containing from 40 to 50% by weight of solids) | 4 to 16 |
| Aqueous ammonia (28%) | 0.5 to 50 |
| Solubilized phenyl mercuric acetate (sufficient to produce a content of 0.5% to 5% of mercury as mercury based on the weight of the compositions). | |

5. A method of producing compositions, effective as fungicides, which comprises admixing an acrylic polymer emulsion with ammonia to convert the same to a solution, and then admixing an aryl mercuric salt therewith.

6. A method of producing compositions, effective as fungicides, which comprises admixing from 1 to 32 parts of an acrylic polymer emulsion containing from 35 to 50% by weight of solids with from 0.5 to 50 parts of concentrated aqueous ammonia to convert said emulsion to a solution, and then admixing therewith a sufficient amount of a solubilized phenyl mercuric acetate containing from 25 to 35% by weight of said phenyl mercuric acetate, said parts being by weight, to produce compositions containing from 0.5% to 5% of mercury as mercury.

References Cited in the file of this patent

UNITED STATES PATENTS

| | | |
|---|---|---|
| Re. 23,863 | Sowa | Aug. 31, 1954 |
| 2,556,451 | Smith | June 12, 1951 |
| 2,624,690 | Leader | June 6, 1953 |
| 2,652,332 | Hedrick | Sept. 15, 1953 |
| 2,754,241 | Schwerdle | July 10, 1956 |
| 2,804,073 | Gulliene | Aug. 27, 1957 |
| 2,951,766 | White | Sept. 6, 1960 |

FOREIGN PATENTS

| | | |
|---|---|---|
| 770,966 | Great Britain | Mar. 27, 1957 |